P. S. SWARTZ & A. ARNOT.
Plow.
No. 226,567.                        Patented April 13, 1880.
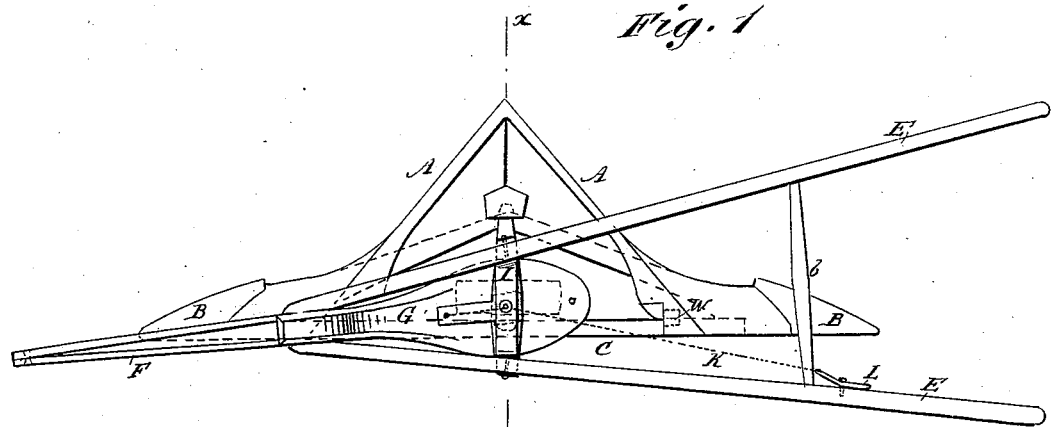
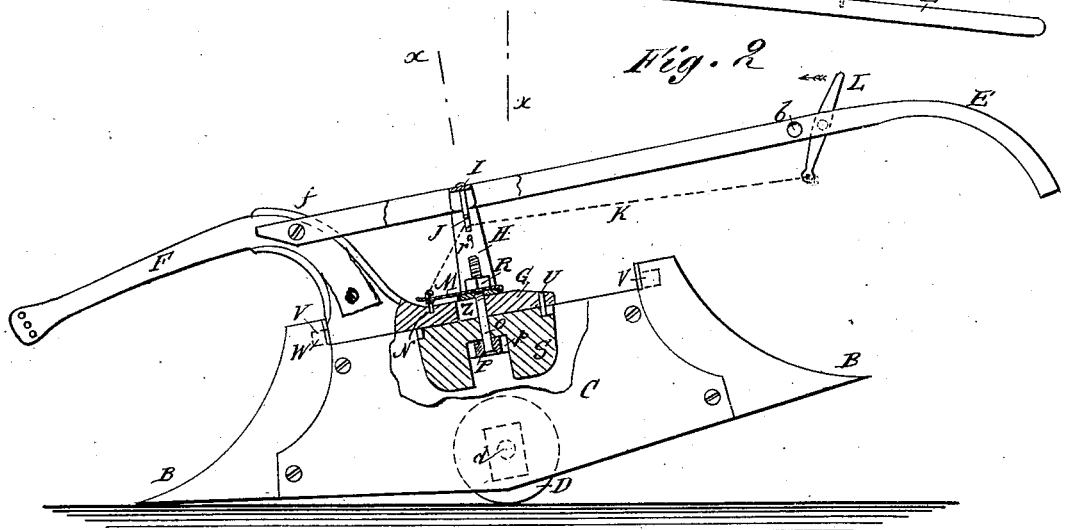
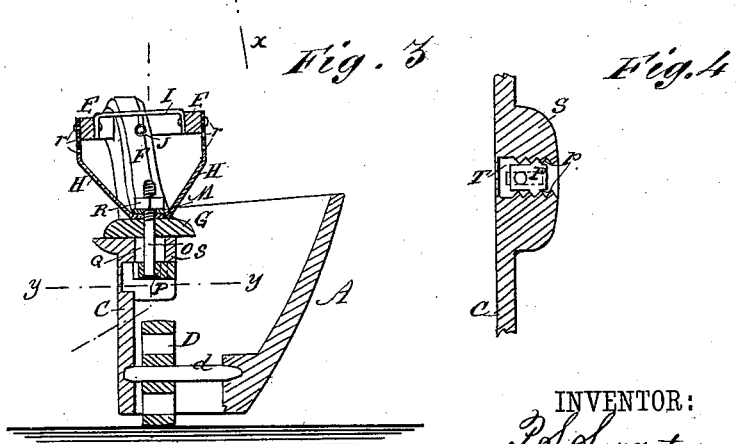
WITNESSES:                          INVENTOR:
C. Neveux                           P. S. Swartz
C. Sedgwick                         A. Arnot
                                BY  Munn & Co
                                    ATTORNEYS.

UNITED STATES PATENT OFFICE.

PETER S. SWARTZ AND ALEXANDER ARNOT, OF LEXINGTON, MICHIGAN.

PLOW.

SPECIFICATION forming part of Letters Patent No. 226,567, dated April 13, 1880.

Application filed September 15, 1879.

*To all whom it may concern:*

Be it known that we, PETER S. SWARTZ and ALEXANDER ARNOT, of Lexington, in the county of Sanilac and State of Michigan, have invented a new and useful Improvement in Plows, of which the following is a specification.

The object of this invention is to provide a double-ended plow so arranged that movement of the same can be easily reversed at the end of the furrow.

The invention consists of a double-ended plow having the beam-head, to which the beam and the handles are attached, pivoted to a plate on the upper edge of the land-side in such a manner that the motion of the plow can be reversed by simply turning the handle and beam around the pivot, the body of the plow not being changed in its position.

In the accompanying drawings, Figure 1 is a plan view of the plow. Fig. 2 is a side view, showing a longitudinal vertical section of the beam-head. Fig. 3 is a vertical cross-section on the line $x\ x$. Fig. 4 is a detail section on the line $y\ y$ of the plate fastened to the upper edge of the land-side.

Similar letters of reference indicate corresponding parts.

A A represent the mold-boards, cast in one piece, or formed out of one piece of steel, and provided with their respective points B B. C represents the land-side of the two mold-boards, and is also made in one piece. Both the mold-boards and the land-side are inclined downwardly toward the center of the plow, the base forming an obtuse angle, so that in whatever direction the plow may be drawn the point that is at the front is depressed, and enters into the soil very easily, whereas the other end is raised, and does not come in contact with the ground.

A wheel, D, attached to an axis, $d$, pivoted between the lower parts of the land-side and mold parts, supports the middle of the plow.

E E represent the handles, which are attached to the beam at $f$, and are supported by the standards H H, attached to the beam-head G, and connected by the brace I and bar $b$.

The beam F is constructed of two flat wrought-iron bars, between which the colter and a wheel-standard may be fastened, and which are fastened in grooves of the cast beam-head G. This beam-head rests on the plate or block S, fastened to the upper edge of the land-side C, and provided with a slot, Q, extending in a direction at right angles to the land-side.

The head G has a slot, Z, extending in the direction of the length of the head, and through which the bolt O, provided with a nut, R, at the upper end, and a head, P, furnished with two triangular teeth at the lower end, passes.

The slots Q Z respectively allow a lateral and longitudinal adjustment of the head.

The teeth of the head P rest in toothed notches T in the block S and extend partially into the land-side C.

The bolt O passes through the base of the standards H and through a spring, M, the end of which is provided with a pin, N, that fits into a small hole on the upper surface of the head G. The end of the spring is fastened to a wire or chain, K, which passes through a ring, J, suspended from the brace I, and is attached to the lower end of a lever, L, pivoted to the side of one of the handles E.

The forward end of the beam-head G is provided with a tenon, W, which fits into a mortise, V, formed at both the junctions of the land-side and the mold-board. The other end of the beam-head is provided with a pin, U, fitting into notches at each end of the plate S.

The handles E E may be adjusted on the standards H by means of a pin and the holes $r\ r$.

The operation is as follows: Whenever it is desired to reverse the motion of the plow the lever L is moved in the direction of its arrow and raises the spring M and disengages the pin N. The head is then drawn toward the driver a small distance, sufficient to take the tenon W out of the mortise V and the pin U out of its notch. The head, with the beam and handles, is then turned around the bolt O until the tenon W is opposite the mortise on the other side, into which it is then placed. As soon as the head has been pushed forward the spring M will press the pin N into its notch and lock the head in the desired position.

The width of the furrows is regulated in the following manner: The nut R is loosened until the bolt can be lowered sufficiently to disengage the teeth $p$ on the head P from the teeth in the side of the notch. The bolt is then moved to the right or left, as may be necessary, until it is in the desired position, and the teeth $p$ catch in one of the teeth in the side of the notch. The nut R is then drawn up tight and the plow is ready for use.

The teeth $p\,p$ and the teeth in the notch need not necessarily be triangular in shape, but may be of any other suitable shape or form.

Having thus described our invention, we claim as new and desire to secure by Letters Patent—

In a reversible plow having an angular base and supporting center-wheel, the combination of the longitudinally-slotted beam-head G, having tenon W, with the block S, having a toothed cross-slot, the bolt O, provided with a toothed head, the mold-boards having mortise V, and spring-pin M N, substantially as shown and described.

PETER S. SWARTZ.
ALEXANDER ARNOT.

Witnesses:
WILLIAM SCOTT,
E. S. JONES.